United States Patent [19]
Espinosa et al.

[11] 3,871,483
[45] Mar. 18, 1975

[54] VEHICULAR DRAINAGE SYSTEM

[76] Inventors: Rene J. Espinosa; Dominador Espinosa, both of 21 S. Stone Ave., La Grange, Ill. 60525

[22] Filed: Sept. 10, 1973

[21] Appl. No.: 395,434

Related U.S. Application Data

[63] Continuation of Ser. No. 133,138, April 12, 1971, abandoned.

[52] U.S. Cl............. 184/1.5, 137/614.11, 251/294
[51] Int. Cl............................................. F01m 11/04
[58] Field of Search ............ 184/1.5; 251/293, 294, 251/216, 339; 137/351, 614.11, 614.12, 614.13, 614.14

[56] References Cited
UNITED STATES PATENTS

| | | | |
|---|---|---|---|
| 193,231 | 5/1877 | Distelrath | 137/614.11 |
| 1,233,482 | 7/1917 | Kaletay | 137/614.12 |
| 1,557,390 | 10/1925 | Tolk et al. | 184/1.5 |
| 1,626,089 | 4/1927 | Jakosky | 251/294 |
| 2,085,876 | 7/1937 | Steen | 251/294 |
| 2,301,821 | 11/1942 | Scott | 137/614.11 |
| 3,103,947 | 9/1963 | Mueller | 137/351 |
| 3,200,842 | 8/1965 | Wilson | 137/614.11 |
| 3,387,621 | 6/1968 | Schaff | 184/1.5 X |
| 3,537,679 | 11/1970 | McCarthy | 251/294 |

*Primary Examiner*—Manuel A. Antonakas
*Attorney, Agent, or Firm*—Stevens, Davis, Miller & Mosher

[57] ABSTRACT

A vehicular drainage system is disclosed having an elongated tubing permitting drainage by the owner of the vehicle. A valve is installed near the bottom of the sump to prevent drainage if the tubing becomes separated from the sump. The valve is activated by a wire or cable arrangement connected to the drain cork or plug. Movement of the cock or plug causes tension on the valve permitting drainage.

5 Claims, 6 Drawing Figures

INVENTORS
RENE J. ESPINOSA
DOMINADOR ESPINOSA
BY Stevens, Davis, Miller & Mosher
ATTORNEYS

VEHICULAR DRAINAGE SYSTEM

This is a continuation of application Ser. No. 133,138, filed Apr. 12, 1971 now abandoned.

This invention relates to an improvement in draining devices in vehicles, particularly to drain lines on automobiles and more particularly, to crank case drains.

At the present, changing a fluid in motorized vehicles, be it oil, water, antifreeze or transmission fluid, tends to be a messy, potentially accident-prone, and time-consuming job when undertaken by an individual. It is necessary to either crawl underneath the vehicle or to employ a service station lift. Thus, understandably, most vehicle owners prefer to have such jobs performed at a neighborhood service station and to pay for the charge of draining motor fluid, rather than doing the job themselves.

The instant invention is directed to the insertion of a pipe or hose into the opening of a vehicular sump or reservoir such as a crankcase, transmission housing, or radiator. The pipe, hose or combination of both can extend to any side of the vehicle permitting the individual owner to drain the desired fluid in an efficient and clean manner. The end of the extension contains a plug or a valve to shut off the drainage. When a hose is used for the extension, a hook may be attached to keep the hose close to the vehicle to prevent it from dragging on the ground.

Another aspect of the instant invention is directed to a device in an automobile crankcase or the like to inhibit unnecessary drainage. The improvement results in the utilization of a check-valve or coupling-valve such as a ball valve into the crankcase opening.

It is further contemplated to use such a check or coupling valve connected to a hose or pipe extending underneath the vehicle and attaching a release drain cock or plug at the end thereof.

It is a further embodiment in the instant invention to extend a wire or cable through the hose or pipe connected at one end to the coupling or check valve and connected at the other end to the aforementioned release cock or plug. The release cock or plug will preferably contain a hole in the center in which the cable will be permitted to pass. When the cable is measured to the proper length, the cable will be soldered to the head of the release cock or plug. The cable can be loose or taut. It need only be such that it will open the valve when the drain cock or plug is opened.

In order to drain the fluid from the sump, one merely loosens the release cock or plug, which in turn opens the coupling valve or check valve. By opening the release cock or plug, the drainage valve is uncovered and the fluid drains from the sump. To shut off the plug drainage, all that is required is to simply tighten the release cock or plug to reverse the operation.

If for some reason, the hose or pipe is cracked or broken, or is completely cut, the flow of fluids is protected by the coupling or check valve in the sump. This is the primary reason for using the valve arrangement in the drainage system.

The invention can be more fully understood by reference to the drawings.

FIG. 1 shows a side view of a preferred embodiment of the invention wherein a long tubular device is connected to a vehicle reservoir or sump. The tubing extends underneath the vehicle to a readily accessible position. At the end of the tubing on the vehicular side is a drain plug which is described with more particularity at FIG. 6.

FIG. 2 shows a ball valve arrangement at the reservoir which is connected underneath the reservoir. In regular operation the ball is held against the seat by the force of the spring. If the fluid is to be drained, pressure applied to the cable causes the cam to displace the ball to permit drainage.

FIG. 3 shows a check valve attached to the reservoir or sump at the bottom. The upward acting pressure of the spring keeps the valve closed. Pressure on the cable operates to pull the valve downward to permit fluid drainage through the tubing.

Figure 6:
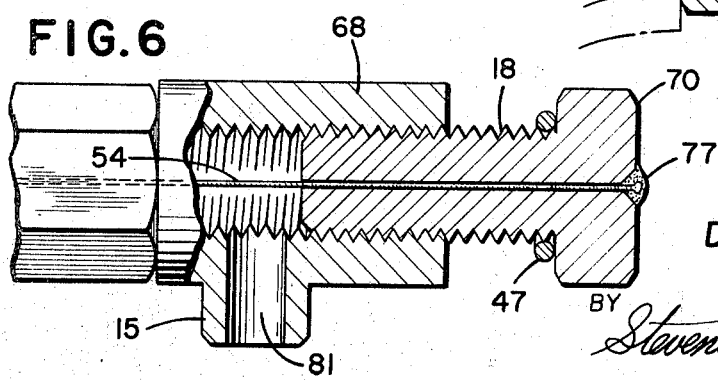

FIG. 6 shows the outside arrangement of the draining device. The cable is stretched taut and then held in place by fastening such as by soldering to the drain plug in the closed position at the outside end of a hole which had been drilled therethrough. When the plug is turned to permit drainage through the drainage hole, the movement of the cable causes the valve at the other end to open.

It is clear that a drain cock rather than a drain plug can be used as well. By turning the drain cock which has a cable connected thereto, the valve at the other end will open.

Figure 1:
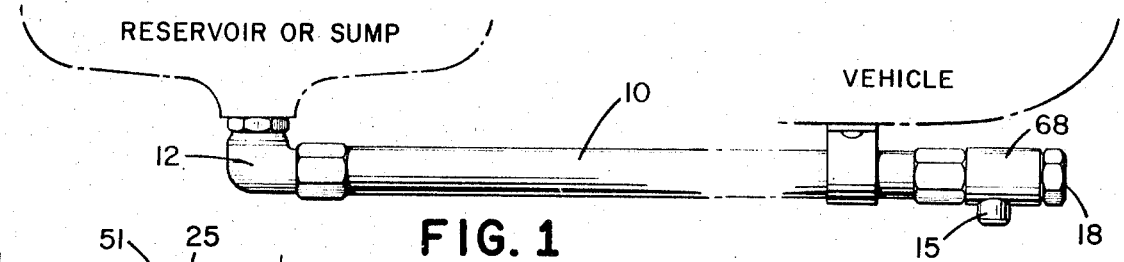

As shown in FIG. 1, a valve housing 12 is connected to the bottom of a reservoir or sump at one end and to an elongated piece of tubing 10 at the other end. This tubing is of no special shape, construction or length but must be such to convey fluids from the sump to the drainage spout 15. A drain plug 18 is inserted into the drainage housing. The drain plug is preferably threaded in order to achieve a better seal at this end of the system.

Figure 2:
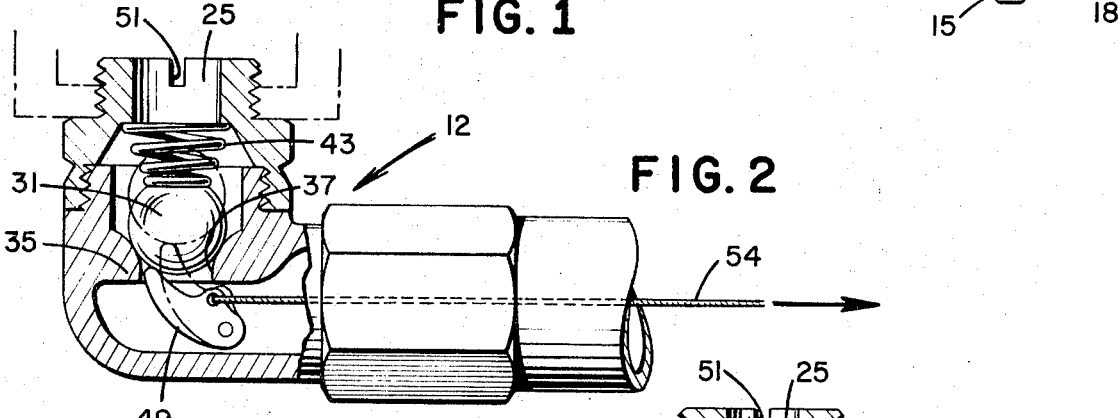

In FIG. 2, there is shown a preferred embodiment of a valve of the instant invention. The housing is generally shown as 12. A ball 31 is held in place against valve seat 35 having port 37 by spring 43. If the valve is to be opened, tensioning of cable 54 will move cam 49 in an upward position moving ball 31 off the valve seat 35 and port 37 permitting fluid to flow from the sump.

The top portion of port 25 has groove 51 contained therein in order to permit total drainage of the fluid contained in the reservoir or sump. This arrangement adds to the efficiency of the total system. Preferably, the groove is transverse as indicated in the drawing but any groove may be employed.

Housing 12 is preferably divided into a top and bottom threaded portion in order to permit ease of assembly and repair, if necessary.

Figure 3:
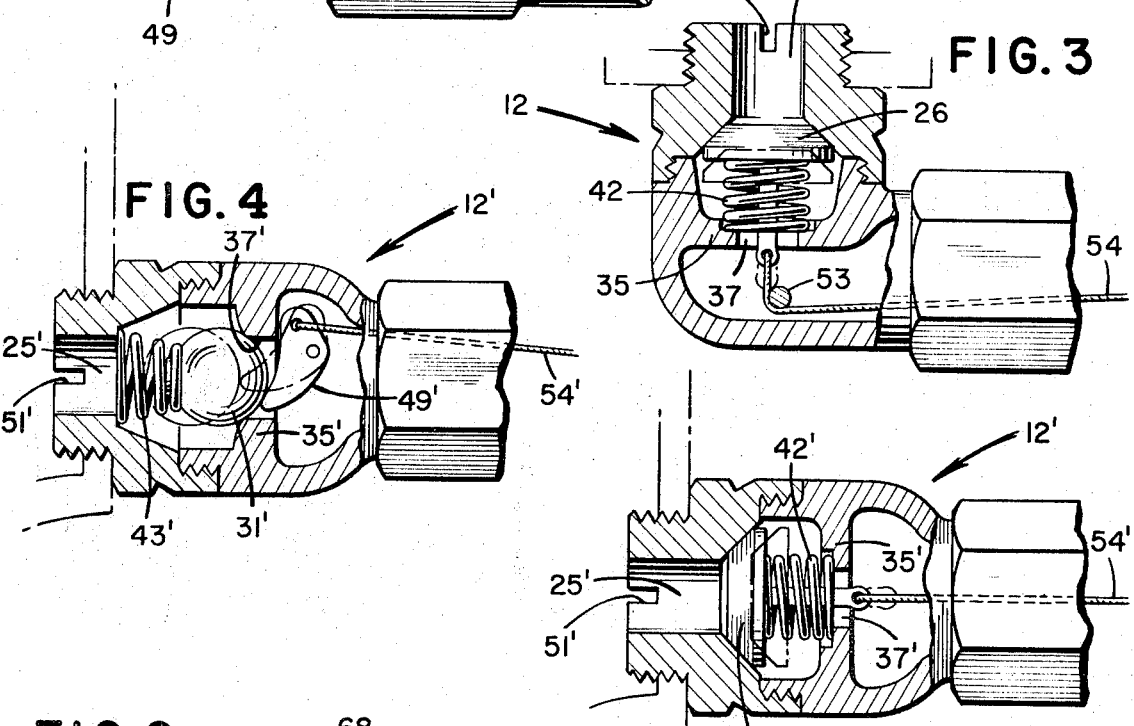

Another type of valve arrangement is pictured in FIG. 3. This is a check valve wherein a valve plate 26 is held against the housing seat by the upward acting pressure of spring 42. If drainage is desired, pressure on the cable will pull the valve plate 26 downward and fluid will drain out of the sump through port 25 and groove 51. A pin 53 is used to permit translation of the cable movement from a downward to a lateral direction.

Figure 4:
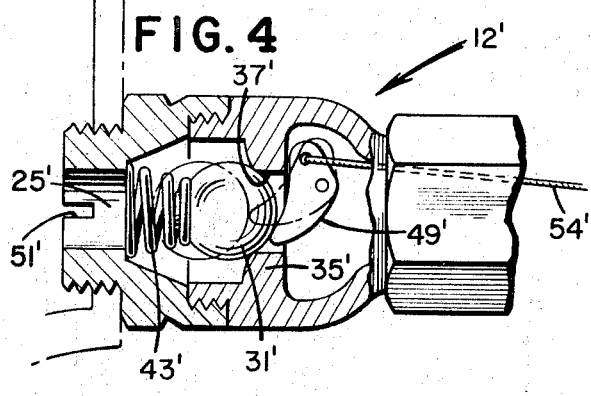
FIG. 4 shows a ball valve as described in FIG. 2 but attached to the side of the reservoir or sump. The only modification required is to change the fulcrum angle in order to open the ball valve by cable pressure exerted on the cam.

In FIG. 4, the valve arrangement set out in FIG. 2 has been placed on the side of the sump. Again when outward tension is placed upon cable $54^1$, the ball $31^1$ moves off the valve seat $35^1$ and port $37^1$ due to the movement of cam $49^1$. The motion of ball $31^1$ from the housing seat displaces spring $43^1$ in an inward direction to permit fluid drainage. Groove $51^1$ is optional.

Figure 5:
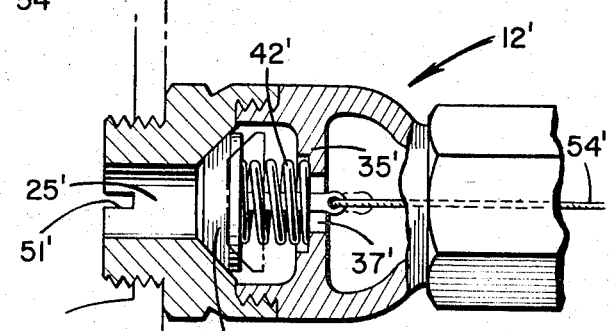
FIG. 5 shows a check valve attached at the side rather than at the bottom of the sump. Since the cable pressure will be exerted lineally, there is no necessity for the use of a pin shown in FIG. 3 to change the cable direction.

The placement of a check valve near the bottom of the sump is shown in FIG. 5. Here cable pressure results in a straight lateral movement of the valve plate $26^1$ away from the valve seat to permit drainage of fluid from the sump through port $25^1$ via groove $51^1$. The spring $42^1$ is compressed toward the housing seat.

FIG. 6 shows a drain plug used in the instant invention. The plug 18, having a hexagonal face 70 is connected to the drainage housing 68 by a screw connection. An O-ring 47 is used to effect a tighter seal when the drain plug is screwed into the housing. The cable is shown in a taut condition since the valve at the other end of the drainage system is open. The cable is connected to the drain plug 18 by a piece of solder 77 at the outside of the drain plug. A hole is drilled through the drain plug in order to permit acceptance of the cable.

Although the cable is shown pictorially as always being taut, in actual practice, it need not be taut when the valve is in the closed position. There should be sufficient slack to permit the drain plug 18 to open past the drain hole 81 in drainage spout 15.

The shape of the tube is not critical and the only limitations upon it are that it be capable of transmitting fluid and not drag on the ground.

The invention is not limited to the detailed description of the drawings but rather only by the appended claims.

What is claimed is:

1. A drainage system comprising a check or coupling valve attachable to a vehicular sump, said valve seated on a valve seat, a length of tubing attached at one end to the outlet side of the valve seat, a rotatable drain plug movably secured to the other end of said tubing, said other end of said tubing defining a drain hole, and a cable interconnecting said valve and plug through said tube, said plug closing said drain hole in the tubing when inactivated and simultaneously uncovering the drain hole and opening the valve when activated.

2. The system of claim 1 connected to a crankcase.

3. The system of claim 1 connected to a radiator.

4. The system of claim 1 connected to a transmission housing.

5. The system of claim 1 wherein a vertical groove is contained in the upper portion of the coupling between said sump and said valve.

* * * * *